United States Patent [19]

Francis et al.

[11] Patent Number: 5,281,560
[45] Date of Patent: Jan. 25, 1994

[54] NON-LEAD SEALING GLASSES

[75] Inventors: Gaylord L. Francis, Painted Post; Robert Morena, Caton, both of N.Y.

[73] Assignee: Corning Incorporated, Corning, N.Y.

[21] Appl. No.: 78,648

[22] Filed: Jun. 21, 1993

[51] Int. Cl.$^5$ .......................... C03C 3/16; C03C 3/21; C03C 8/24

[52] U.S. Cl. ...................................... 501/15; 501/17; 501/18; 501/19; 501/45; 501/46; 501/48

[58] Field of Search ................. 501/45, 46, 47, 48, 501/49, 52, 14, 15, 17, 18, 19, 21, 24, 26

[56] References Cited

U.S. PATENT DOCUMENTS

| | | | |
|---|---|---|---|
| 2,400,147 | 7/1942 | Hooley | 501/45 |
| 3,407,091 | 10/1968 | Busdiecker | 501/45 |
| 4,314,031 | 2/1982 | Sanford et al. | 501/45 |
| 4,940,677 | 7/1990 | Beall et al. | 501/45 |
| 5,021,366 | 6/1991 | Aitken | 501/45 |
| 5,071,795 | 12/1991 | Beall et al. | 501/44 |
| 5,089,445 | 2/1992 | Francis | 501/15 |
| 5,089,446 | 2/1992 | Cornelius et al. | 501/15 |
| 5,122,484 | 6/1992 | Beall et al. | 501/15 |
| 5,179,046 | 1/1993 | Francis et al. | 501/19 |

Primary Examiner—Karl Group
Assistant Examiner—Deborah Jones
Attorney, Agent, or Firm—Milton M. Peterson; Clinton S. Janes, Jr.

[57] ABSTRACT

Lead-free, tin phosphate glasses contain 25–50 mole percent $P_2O_5$, 30–70% SnO, 0–15% ZnO, the mole ratio of SnO:ZnO being greater than 5:1, and an effective amount up to 25% total of at least one oxide in the indicated proportion selected from the group consisting of up to 25% $R_2O$, wherein $R_2O$ consists of 0–25% $Li_2O$, 0–25% $Na_2O$, and 0–25% $K_2O$, up to 20% $B_2O_3$, up to 5% $Al_2O_3$, up to 5% $SiO_2$, and up to 5% $WO_3$. The glasses are particularly useful as sealing glass frits in sealing material to join component parts in electrical and electronic devices. The sealing glass material may contain mill additions to reduce the effective coefficient of thermal expansion in a seal, as well as a strength reinforcing additive having a coefficient of thermal expansion preferably below $120 \times 10^{-7}/°C$.

18 Claims, No Drawings

NON-LEAD SEALING GLASSES

FIELD OF THE INVENTION

Tin phosphate glasses used as mid-temperature sealing glass frits in a vitreous fusion seal.

BACKGROUND OF THE INVENTION

Joining of component parts together with a fused glass seal to form a composite article is a well-cultivated art. In particular, numerous special sealing glasses have been developed for use in joining glass parts with each other, or with metals, alloys, or ceramics.

In making a fusion-type seal, the material must be heated to a temperature where it becomes soft enough to wet the sealing surface and form an adherent, hermetic bond. For many purposes, it is desirable to maintain the sealing temperature as low as possible. This is particularly true in electrical and electronic articles where thermally sensitive parts or coatings are commonly employed.

Accordingly, considerable attention has been given to lead glasses as low temperature sealing glasses. For example, stable sealing glasses, having softening points in the 430°-500° C. range and coefficients of thermal expansion in the $70-90 \times 10^{-7}/°C$. range, are disclosed in U.S. Pat. No. 2,642,633 (Dalton). Subsequent studies centered on lead-zinc borate type glasses that were subject to thermal devitrification or crystallization. These glasses were intensively investigated in the search for cathode ray tube sealing materials.

For many sealing and coating purposes, glasses are used in powder form, termed glass frits. One such application is forming a seal between the funnel and panel members of a cathode ray tube. Sealing glass frits are commonly mixed with an organic vehicle, such as amyl acetate, to form a flowable or extrudable paste. This mixture may then be applied to a sealing surface, e.g., the peripheral rim of a funnel or panel member. It is also known to incorporate mill additions in a glass frit mixture, a primary reason being modification and/or control of the ultimate coefficient of thermal expansion in a seal.

Copending application Ser. No. 924,107, filed Aug. 3, 1992 in the names of Aitken et al., and assigned to the same assignee as the present application, discloses non-lead sealing glasses especially designed for use in cathode ray tube (CRT) sealing frits. These glasses are SnO-ZnO-$P_2O_5$ glasses that have compositions that, as calculated on a mole percent basis, consist essentially of 25-50% $P_2O_5$ plus SnO and ZnO in amounts such that the mole ratio of SnO:Zno is in the range of 1:1 to 5:1.

The glasses there disclosed have proven quite satisfactory for CRT sealing purposes. However, for electrical and electronic sealing purposes, it would be highly desirable to have sealing glasses with even lower sealing temperatures. This means that the desired glasses would have good flow characteristics at such lower sealing temperatures.

A major consideration in a sealing glass frit is that it provides low residual strain in a seal. This generally requires that the ultimate seal have a coefficient of thermal expansion (CTE) that is a reasonably close match for the CTEs of the parts being sealed.

Electronic and electrical sealing applications tend to involve a large number of different materials. Further, these materials tend to have CTEs that vary over a wide range. The required CTEs are generally lower than the values of $95-105 \times 10^{-7}/°C$. encountered in sealing CRT components. Thus, typical requirements are a CTE of 65-70 to match alumina; 30-40 to match silicon and borosilicate glasses; and 0-10 to match certain glass-ceramics and fused silicas (all values $\times 10^{-7}/°C$.).

In addition to flow and expansion compatibility, a sealing glass frit can desirably possess a number of other favorable characteristics. These include good wettability of the glass parts being sealed, solubility in a common industrial solvent for salvage purposes, and compatibility with organic vehicles. In particular, a frit can desirably be compatible with amyl acetate, a vehicle currently used commercially with lead glass frits.

Lead-zinc borate sealing glasses, both crystallizing and non-crystallizing, have been used over a long period of time, and have proven very successful. Nevertheless, there has been a continuing desire for a sealing glass frit having all the favorable characteristics of a lead-zinc borate glass, but with a somewhat lower sealing temperature. Furthermore, as a health and safety measure, strenuous efforts are being made to avoid use of lead compounds as far as possible.

Accordingly, a basic purpose of the present invention is to provide a lead-free sealing glass frit. A further purpose is to provide a lead-free glass frit having characteristics particularly suited to forming a fusion seal between components for electronic and electrical devices. Another purpose is to provide a means of altering the effective CTEs of the lead-free glasses to extend their potential utility to sealing components having lower CTEs. Still another purpose is to provide a mid-temperature sealing glass frit capable of forming a fusion seal at a temperature in the range of 400-430° C. Yet another purpose is to increase the strength of seals prepared from the frits by the inclusion of reinforcing fibers and fillers therein.

SUMMARY OF THE INVENTION

The glasses of our invention are lead-free, tin phosphate glasses, the compositions of which, as calculated in mole percent on an oxide basis, consist essentially of 25-50% $P_2O_5$, 30-70% SnO, 0-15% ZnO, the mole ratio of SnO:ZnO being greater than 5:1, and an effective amount up to 25% total of at least one stabilizing oxide in the indicated proportion selected from the group consisting of up to 25% $R_2O$, wherein $R_2O$ consists of 0-25% $Li_2O$, 0-25% $Na_2O$, and 0-25% $K_2O$, up to 20% $B_2O_3$, up to 5% $Al_2O_3$, up to 5% $SiO_2$, and up to 5% $WO_3$.

The invention further resides in a sealing material containing as an active ingredient a lead-free, tin phosphate glass frit, the composition of which, as calculated in mole percent on an oxide basis, consists essentially of 25-50% $P_2O_5$, 30-70% SnO, 0-15% ZnO, the mole ratio of SnO:ZnO being greater than 5:1, and an effective amount up to 25% total of at least one stabilizing oxide in mole percent selected from the group consisting of up to 25% $R_2O$, wherein $R_2O$ consists of 0-25% $Li_2O$, 0-25% $Na_2O$, and 0-25% $K_2O$, up to 20% $B_2O_3$, up to 5% $Al_2O_3$, up to 5% $SiO_2$, and up to 5% $WO_3$.

The invention also contemplates a composite article composed of at least two component parts, the parts being joined by a fusion seal; that is, the fused product of a sealing material containing, as an active ingredient, a tin phosphate sealing glass frit, the composition of which, as calculated in mole percent on an oxide basis, consists essentially of 25-50% $P_2O_5$, 30-70% SnO, 0–15% ZnO, the mole ratio of SnO:ZnO being greater than 5:1, and an effective amount up to 25% total of at least one stabilizing oxide in mole percent selected from the group consisting of up to 25% $R_2O$, wherein $R_2O$ consists of 0–25% $Li_2O$, 0–25% $Na_2O$, and 0–25% $K_2O$, up to 20% $B_2O_3$, up to 5% $Al_2O_3$, up to 5% $SiO_2$, and up to 5% $WO_3$.

PRIOR ART

Attention is directed to the following U.S. patents that disclose phosphate glasses that may contain tin and/or zinc:

No. 2,400,147 (Hooley) describes a fluorescent, zinc aluminophosphate glass containing SnO and MnO as fluorescing agents.

No. 4,940,677 (Beall et al.) discloses $R_2O$-ZnO-$P_2O_5$ glasses that optionally contain numerous oxides, one of which may be up to 35 mole % SnO. The glasses have transition temperatures below 450° C.

No. 5,021,366 (Aitken) discloses $R_2O$-ZnO-$P_2O_5$ glasses for molded glass lenses. The glasses may contain up to 20 mole % SnO to increase refractive index.

No. 5,071,795 (Beall et al.) discloses $R_2O$-ZnO-$P_2O_5$ glasses that optionally contain up to 10 mole percent SnO. The glasses have transition temperatures below 350° C.

The following U.S. patents disclose sealing glasses and mixtures:

No. 3,407,091 (Busdiecker) discloses $R_2O$-$Al_2O_3$-ZnO-$P_2O_5$ glasses for sealing metals to metal or glass.

No. 4,314,031 (Sanford et al.) discloses tin-phosphorous-oxyfluoride glasses having very low transition temperatures.

No. 5,089,445 (Francis) discloses the use of pyrophosphates having the crystalline structure of magnesium pyrophosphate to reduce the effective CTE of lead borate sealing glasses.

No. 5,089,446 (Cornelius et al.) discloses mill additions, including the pyrophosphates, to reduce the effective CTEs of the Sanford et al. glasses.

DESCRIPTION OF THE INVENTION

Our invention is based in large measure on discovery of a family of tin phosphate glasses. It is further based on the discovery that these glasses provide highly effective low- and mid-temperature (350–450° C.) sealing glasses, particularly in frit form. While not limited in their fields of application, these glasses are of particular interest as replacements for the high lead content sealing glasses currently used as mid-temperature sealing glasses. A major feature of the present glasses is their freedom from lead.

The glasses disclosed in the Aitken et al. application are characterized by a SnO:ZnO ratio of 1:1 to 5:1. The present glasses also preferably contain ZnO, but in smaller amounts with respect to the SnO content. Thus, the presence of ZnO is optional, and, when present, the molar ratio of SnO:ZnO is greater than 5:1.

The decrease in relative ZnO content tends to soften the glass and result in good flow characteristics. However, it creates a problem of glass exuding during sealing and creating a weak seal. For example, a stannous pyrophosphate composition, that is, a glass consisting of SnO and $P_2O_5$, showed some flow at 345° C., but tended to exude glass, to devitrify and to become weak at higher sealing temperatures. Exudation of glass is integrally associated with devitrification. To counter this trend, ZnO may be added, but the glasses with high SnO:ZnO ratios are still difficult to control.

We have found that the glasses with higher SnO:ZnO ratios can be stabilized to provide good sealing frits. To this end, we include up to 25 mole % total of at least one oxide selected from the group consisting of up to 25 mole % $R_2O$, wherein $R_2O$ consists of 0–25% $Li_2O$, 0–25% $Na_2O$, and 0–25% $K_2O$, up to 20% mole % $B_2O_3$, up to 5 mole % $Al_2O_3$, up to 5% $SiO_2$, and up to 5% $WO_3$, the selected oxide being present in an amount effective to stabilize the glass against devitrification and/or exudation during sealing. In general, we have found that at least 1 mole % of one of the above oxides alone or a combination of two or more of the oxides is necessary to assure substantial stabilization. With such additions, reasonably good flow characteristics can be retained while avoiding the crystallization and loss of strength encountered in their absence. $Li_2O$ is the most preferred alkali metal oxide ($R_2O$) for stabilization purposes.

A further problem is encountered in that coefficients of thermal expansion (CTEs) of the present glasses tend to be in the range of $120$–$140 \times 10^{-7}$/°C. As indicated earlier, such values are much too high for many electronic and electrical sealing applications. We have found this can be remedied by adding substantial amounts of certain fillers that provide a lower effective CTE in a sealing frit. Among the fillers found particularly effective are cordierite, $Li_2O$-$Al_2O_3$-$SiO_2$ glass-ceramics, and a crystalline pyrophosphate having at least one cation component selected from the group consisting of $Mg^{+2}$ and $Co^{+2}$.

The capability of halides, particularly fluorides, to soften a glass, and thus lower its sealing temperature, is well known. However, where a product must operate under a vacuum, there is concern that such halide-containing glasses may outgas during bakeout. Therefore, it is a feature of our glasses that they may be halide-free.

It is also known that the presence of alkali metal oxides ($R_2O$) may soften a glass. Such additives may also improve wettability of a sealing surface. However, they tend to increase the coefficient of thermal expansion and/or lower resistance to weathering. Further, in electrical applications, alkali in a glass may adversely affect electrical properties, and may tend to migrate. Accordingly, it is a further feature of our glasses that they may be alkali-free.

In addition to this primary function of stabilizing the present glasses, up to about five mole percent $SiO_2$ lowers the coefficient of thermal expansion. Up to about twenty mole percent $B_2O_3$, but preferably not over ten, lowers the coefficient of thermal expansion of the glass, and up to about five mole percent $Al_2O_3$ improves durability.

A key requirement in the present glasses is that the glass be in a reduced state, that is, the tin be predominantly in the stannous ($Sn^{+2}$) state. To this end, tin is added to a glass batch in stannous form, that is, as black tin (SnO). Alternatively, if light tin ($SnO_2$) is employed, a reducing agent, such as sugar, should be added to insure that a predominant amount of the tin is in a divalent (SnO) state. However, care must be taken not to employ such vigorous reducing conditions that the tin is further reduced to the metal. Where $SnO_2$ is present in substantial amount, the frit does not flow and wet the sealing surface as desired for a strong seal.

Good glass formation is obtained with $P_2O_5$ contents ranging from an orthophosphate level, i.e., about 25 mole % $P_2O_5$, to a metaphosphate level, i.e., about 50 mole $P_2O_5$.

For a frit to use in sealing components, we prefer that the glass contains 29–35 mole percent $P_2O_5$, more preferably at or near the pyrophosphate stoichiometry, that is, about 33% $P_2O_5$. Lower $P_2O_5$ content frits tend to provide erratic and nonreproducible flow behavior in sealing operations. Frits with higher $P_2O_5$ levels tend to be less durable against chemical attack.

Optionally, we can include at least one component selected from the group consisting of up to 5 mole % $MoO_3$, up to 5 mole % $WO_3$, and up to 0.1 mole % Ag in the glass batch, the selected component being present in an amount effective to promote the adherence characteristics of the sealing frit. Those maxima correspond to 5.5 wt. % $MoO_3$, 8.7 wt. % $WO_3$ and 0.08 wt. % Ag metal.

The distinctive nature of the present glass sealing frits, as compared to those described in the Aitken et al. application noted earlier, may be seen from comparison of certain relevant properties. All glasses compared were three-component glasses ($SnO-ZnO-P_2O_5$) with 33 mole percent $P_2O_5$ and differing only in SnO:ZnO ratios.

Glass transition temperature (Tg) is a measure of the temperature at which flow can initiate in a glass as determined by differential scanning calorimetry (DSC). Tg values decrease rapidly from about 450° C. to about 285° C. as the SnO:ZnO ratio is increased up to 5:1 from 0, i.e., a zinc pyrophosphate. As the ratio is further increased (the present glasses), the Tg value stabilizes in the range of 250°–275° C.

In like manner, the glass annealing point drops rapidly from about 270° C., at a SnO:ZnO ratio of about 1:1, to about 245° C., and then stabilizes as the SnO level is further increased. However, it is nearly mutually contradictory for a frit to posses both a low-flow-temperature and a low expansion coefficient (CTE). The $SnO-ZnO-P_2O_5$ glasses are no exception. Consequently, the present low ZnO content glasses have CTE values in the range of $120-140 \times 10^{-7}$/°C. over the temperature interval of room temperature (R.T.) to 250° C.

The invention is further described with reference to glass compositions and sealing mixtures that illustrate the invention.

The compositions in TABLE IA are reported in terms of mole percent on the oxide basis as calculated from a glass batch. Corresponding compositions in terms of parts by weight are presented in TABLE IB. Since the totals of these compositions approximate 100, the individual values may be taken as weight percentages.

TABLE IA shows a series of basic, three-component, $SnO-ZnO-P_2O_5$ glass compositions (in mole percent) with increasing SnO:ZnO ratios. Also shown is the temperature (Temp°C.) at which a pressed frit glass cylinder or button exhibited excellent flow. It should be noted, however, that such flow was accompanied by glass exudation, and a weak, crumbling structure as a test piece cooled. This was more pronounced at the higher SnO:ZnO ratios.

TABLE IA

|  | 1 | 2 | 3 | 4 | 5 |
|---|---|---|---|---|---|
| $P_2O_5$ | 33.0 | 33.0 | 33.0 | 33.0 | 33.0 |
| ZnO | 11.2 | 7.4 | 5.0 | 3.2 | 0.0 |
| SnO | 55.8 | 59.6 | 62.0 | 63.8 | 67.0 |
| SnO/ZnO | 5.0 | 8.0 | 12.4 | 20.0 | ∞ |

TABLE IA-continued

|  | 1 | 2 | 3 | 4 | 5 |
|---|---|---|---|---|---|
| Temp (°C.) | 430 | 410 | 410 | 390 | 350 |

TABLE IB

|  | 1 | 2 | 3 | 4 | 5 |
|---|---|---|---|---|---|
| $P_2O_5$ | 35.7 | 38.0 | 37.4 | 37.0 | 36.2 |
| ZnO | 7.0 | 2.7 | 1.8 | 1.1 | — |
| SnO | 57.3 | 59.3 | 60.8 | 61.9 | 63.8 |

All batches were melted in covered silica crucibles. Typical batches were 800–1000g. The melting temperatures were in the range of 800°–1100° C., depending on the glass composition. Melting time was generally held constant at 2 hours. The batch raw materials consisted of SnO (black tin), zinc oxide, and ammonium phosphate. Glasses were formed by pouring the melts onto a steel table, and cooling the melts using a roller to form 0.1" (~0.25 cm) thick ribbon. All compositions were then prepared as frits by dry ball-milling to a mean particle size of 20–50 μm. Samples for thermal expansion or viscosity were obtained by dry-pressing bars from these powders, and then sintering. The bars were fired to a temperature high enough that sufficient densification occurred so that, after cooling, test specimens could be sawed from the sintered bars. Typically, a 1 hour soak time at maximum temperature was used for all specimens.

It is clear from TABLE IA that substantial benefits are associated with higher SnO/ZnO ratio frits since flow can occur at temperatures as low as 350° C. It is notable that these low flow temperatures are obtained without the use of alkali oxides or halides. This makes these frits very attractive for electronic sealing applications where the presence of either alkalies or halides is undesirable because of contamination and possible degradation in electrical stability of the sealed device. In addition, the low sealing temperatures for this family of frits do not require the use of lead or thallium oxide, two components which are toxic and/or hazardous, and typically present in low temperature frits.

However, as noted earlier, frits with high SnO/ZnO ratios have a tendency to crystallize (especially at soak times > 0.5 hr) in such a fashion that any residual glassy phase is exuded to the surface. This is extremely undesirable for the use of these frits for sealing purposes. In addition, the absence of any glassy phase within the interior of the frit produces a very porous and weak structure.

The glass exudation/crystallization phenomena may be eliminated by composition modification of the glass, principally by the addition of $Al_2O_3$, $B_2O_3$, or $SiO_2$. These additional oxides presumably function to depress the tendency for crystallization by tightening the phosphorus-oxygen chains in the glass, making it more difficult for structural rearrangements to take place leading to crystallization.

The effects of $B_2O_3$ and $Al_2O_3$ on crystallization and glass exudation are presented in TABLE IIA for a series of frits with SnO/ZnO ratios in the range 10.0 to ∞, i.e., a tin pyrophosphate. Data are shown for three different SnO/ZnO ratios for "simple" three component frits (i.e., SnO, ZnO, and $P_2O_5$), and for the same compositions with small amounts of $Al_2O_3$, $B_2O_3$, and-/or $Li_2O$ or $WO_3$ added to the glass, all on a mole basis.

In each instance, these additional components served to suppress the tendency for glass exudation (exud.).

TABLE IIA

| Ex. | 6 | 7 | 8 | 9 |
|---|---|---|---|---|
| SnO/ZnO | 10.0 | 10.0 | 12.4 | 12.4 |
| $P_2O_5$ | 33.0 | 32.0 | 33.0 | 31.8 |
| ZnO | 6.1 | 5.9 | 5.0 | 4.8 |
| SnO | 60.9 | 59.0 | 62.0 | 59.8 |
| $B_2O_3$ | — | 1.9 | — | 2.4 |
| $Al_2O_3$ | — | 0.6 | — | 1.2 |
| $WO_3$ | — | 0.5 | — | — |
| $Li_2O$ | — | — | — | — |
| Firing Schedule (1h hold) | 380° | 380° | 430° | 430° |
| Appearance | exud., crumbly | glossy, no exud. | exud., crumbly | glossy, no exud. |

| Ex. | 10 | 11 | 12 | 13 |
|---|---|---|---|---|
| SnO/ZnO | 20.0 | 20.0 | ∞ | ∞ |
| $P_2O_5$ | 33.0 | 32.6 | 33.0 | 31.4 |
| ZnO | 3.2 | 2.5 | — | — |
| SnO | 63.8 | 49.7 | 67.0 | 63.7 |
| $B_2O_3$ | — | — | — | 3.8 |
| $Al_2O_3$ | — | 1.0 | — | 1.0 |
| $WO_3$ | — | 0.5 | — | — |
| $Li_2O$ | — | 13.8 | — | — |
| Firing Schedule (1h hold) | 410° | 410° | 380° | 380° |
| Appearance | exud., crumbly | glossy, no exud. | exud., crumbly | glossy, no exud. |

TABLE IIB records the compositions of TABLE IIA in terms of parts by weight. In like manner to TABLE IB, the totals of the compositions so closely approximate 100 such that, for all practical purposes, the tabulated value of each constituent may be deemed to reflect weight percent.

TABLE IIB

| | 6 | 7 | 8 | 9 | 10 | 11 | 12 | 13 |
|---|---|---|---|---|---|---|---|---|
| $P_2O_5$ | 35.0 | 34.2 | 34.9 | 34.1 | 34.5 | 38.1 | 34.2 | 33.5 |
| ZnO | 3.7 | 3.6 | 3.0 | 2.9 | 1.9 | 1.7 | — | — |
| SnO | 61.3 | 59.8 | 62.1 | 60.8 | 62.6 | 55.1 | 65.8 | 63.8 |
| $B_2O_3$ | — | 1.0 | — | 1.3 | — | — | — | 2.0 |
| $Al_2O_3$ | — | 0.5 | — | 0.9 | — | 0.8 | — | 0.8 |
| $WO_3$ | — | 0.9 | — | — | — | 0.9 | — | — |
| $Li_2O$ | — | — | — | — | — | 3.4 | — | — |

The SnO-ZnO-$P_2O_5$ frits described in this invention disclosure are vitreous, and have a low elastic modulus [approximately $6 \times 10^6$ psi ($\sim 4.2 \times 10^4$ MPa)]. Consequently, these frits have relatively low strength values when tested on a pressed bar or disk fired to a temperature at which flow occurs. Typical strength values for sintered disks are 3,000-4,000 psi ($\sim$21-28 MPa), compared to 5,000-5,500 psi ($\sim$35-38.5 MPa) for a commercial, vitreous, PbO-containing frit. However, as noted previously, the low flow temperatures of these frits permit them to accommodate relatively large amounts of fillers (added as mill additions) and still flow at 400°-500°. The low Young's modulus is actually beneficial since it permits the fillers to be accommodated in the frit without microcracking and resulting strength degradation.

For strength testing, fillers were mixed with the powdered frit by dry-mixing on a set of rollers. The various powders were placed in a plastic container along with some grinding media, and then roller-mixed for 15-30 minutes. Strength specimens were prepared by pressing these mixed powders into disks approximately 1.5" diameter $\times 0.20$" thick ($\sim 3.8 \times 0.5$ cm). After firing, thin disks were prepared by core-drilling and grinding.

One face (the tensile surface) was polished, and then, just prior to actual strength testing, was abraded to introduce a uniform flaw distribution.

The fillers that were investigated were $-325$ mesh $Al_2O_3$, (estimated CTE=70), E-mill zircon, (estimated CTE=50), and S grade zirconia, (estimated CTE=150). The mean particle size of all these fillers was in the 5-10 μm range. Of the materials evaluated as fillers, only α-$Al_2O_3$ and zircon were effective in improving strength. Presumably, this was because their expansion coefficient was lower than that of the frit (CTE of frit=120-140). Cracks tend to deflect towards, and interact with, second phase inclusions having a CTE lower than that of the surrounding matrix. It is thus likely that other fillers with CTE<120, or preferably with CTE<100, would also be effective as reinforcement agents.

Examples of reinforced frits, along with measured strengths, are presented in TABLE III. Generally, 8-10 specimens were tested per set. All specimens were fired at 450° C. or lower. Because of the desire to keep potential seal temperatures<450° C., filler loadings were maintained at 40 wt% or less. Strength values in excess of 5,000 psi ($\sim$35 MPa) were obtained for all filler combinations involving $Al_2O_3$ and/or zircon at filler loadings>25 wt%. Certain combinations of $Al_2O_3$ and zircon produced strength values in excess of 8,000 psi ($\sim$56 MPa).

TABLE III

Strength Properties of Reinforced Frits

| Frit (mole %) Composition | Batch Recipe (wt %) Reinforced Frit | Strength, Mean ± S.D. psi |
|---|---|---|
| $P_2O_5$ 33.0 | 80% frit-20% $ZrO_2$ | 3680 ± 180($\sim$25.8 MPa) |
| ZnO 13.4 | 70% frit-30% $ZrO_2$ | 4300 ± 400($\sim$30.1 MPa) |
| SnO 53.6 | 60% frit-40% $ZrO_2$ | 3600 ± 430($\sim$25.2 MPa) |
| SnO/ZnO 4.0 | 80% frit-20% zircon | 4640 ± 360($\sim$32.5 MPa) |
| | 70% frit-30% zircon | 6000 ± 370($\sim$42 MPa) |
| | 60% frit-40% zircon | 5780 ± 370($\sim$40.5 MPa) |
| | 65% frit-25% zircon-10% $Al_2O_3$ | 8080 ± 470($\sim$56.6 MPa) |
| $P_2O_5$ 32.0 | 80% frit-20% $Al_2O_3$ | 5520 ± 230($\sim$38.6 MPa) |
| ZnO 9.3 | 70% frit-30% zircon | 7350 ± 760($\sim$51.5 MPa) |
| SnO 55.7 | 65% frit-25% zircon-10% $Al_2O_3$ | 8080 ± 470($\sim$56.6 MPa) |
| $Al_2O_3$ 0.6 | | |
| $B_2O_3$ 1.9 | | |
| SnO/ZnO 6.0 | | |

The higher SnO/ZnO ratio frits, although they have low flow temperatures, also have relatively high thermal expansion coefficients, generally in the range 120-140. This is well above values desirable for sealing to potential substrates such as soda-lime-silica glass (CTE=90), alumina (CTE=70), ZnO (CTE=55), borosilicate glass (CTE=35), and silicon (CTE=30). However, the good flow properties of these glasses permit relatively large amounts of mill additions to be added while still keeping potential sealing temperatures within the moderate range of 400°-500°. Potential mill additions include lithium aluminosilicate glass ceramic (LAS), cordierite, and crystalline magnesium pyrophosphates. Listed in TABLE IV are several examples of SnO-ZnO-$P_2O_5$ frits made with mill additions of expansion modifiers. Also given are sealing temperature and the particular substrate used.

TABLE IV

| Frit (mole %) Composition | | Batch Recipe (wt %) | Substrate | Seal Temp | Results |
|---|---|---|---|---|---|
| $P_2O_5$ | 32.0 | 70% frit-20% LAS | $Al_2O_3$ | 430° | Good adherence Good flow |
| ZnO | 9.3 | | | | |
| SnO | 55.7 | | | | |
| $Al_2O_3$ | 0.6 | | | | |
| $B_2O_3$ | 1.9 | | | | |
| SnO/ZnO | 6.0 | | | | |
| $P_2O_5$ | 32.0 | 70% frit-30% LAS | ZnO | 550° | Good adherence Good flow |
| ZnO | 9.3 | | | | |
| SnO | 55.7 | | | | |
| $Al_2O_3$ | 0.6 | | | | |
| $B_2O_3$ | 1.9 | | | | |
| SnO/ZnO | 6.0 | | | | |
| $P_2O_5$ | 32.0 | 67% frit-28% cordierite-5% Magnesium pyrophosphate | borosilicate glass | 500° | Moderate adherence Poor flow |
| ZnO | 9.3 | | | | |
| SnO | 55.7 | | | | |
| $Al_2O_3$ | 0.6 | | | | |
| $B_2O_3$ | 1.9 | | | | |
| SnO/ZnO | 6.0 | | | | |
| $P_2O_5$ | 34.0 | 70% frit-30% LAS | $Al_2O_3$ | 400° | Good adherence Moderate flow |
| ZnO | 3.0 | | | | |
| SnO | 59.7 | | | | |
| $Al_2O_3$ | 0.8 | | | | |
| $B_2O_3$ | 2.0 | | | | |
| $WO_3$ | 0.5 | | | | |
| SnO/ZnO | 20.0 | | | | |
| $P_2O_5$ | 34.0 | 67% frit-33% LAS | borosilicate glass | 500° | Good adherence Good flow |
| ZnO | 3.0 | | | | |
| SnO | 59.7 | | | | |
| $Al_2O_3$ | 0.8 | | | | |
| $B_2O_3$ | 2.0 | | | | |
| $WO_3$ | 0.5 | | | | |
| SnO/ZnO | 20.0 | | | | |
| $P_2O_5$ | 34.0 | 67% frit-28% LAS, 5% Magnesium pyrophosphate | borosilicate glass | 500° | Good adherence Good flow |
| ZnO | 3.0 | | | | |
| SnO | 59.7 | | | | |
| $Al_2O_3$ | 0.8 | | | | |
| $B_2O_3$ | 2.0 | | | | |
| $WO_3$ | 0.5 | | | | |
| SnO/ZnO | 20.0 | | | | |

We claim:

1. A lead-free, tin phosphate glass, the composition of which, as calculated in mole percent on an oxide basis, consists essentially of 25-50% $P_2O_5$, 30-70% SnO, 0-15% ZnO, the mole ratio of SnO:ZnO being greater than 5:1, and an effective amount up to 25% total of at least one stabilizing oxide in the indicated proportion selected from the group consisting of up to 25% $R_2O$, wherein $R_2O$ consists of 0-25% $Li_2O$, 0-25% $Na_2O$, and 0-25% $K_2O$, up to 20% $B_2O_3$, up to 5% $Al_2O_3$, up to 5% $SO_2$, and up to 5% $WO_3$.

2. A phosphate glass in accordance with claim 1 wherein the selected stabilizing oxide is at least $B_2O_3$ and one of $Al_2O_3$ 3. A phosphate glass in accordance with claim 1 wherein the $P_2O_5$ content is 29-35 mole percent.

4. A phosphate glass in accordance with claim 3 wherein $P_2O_5$ content is about 33 mole percent.

5. A phosphate glass in accordance with claim 1 which also contains an effective amount of at least one seal adherence promoter in the indicated proportion selected from the group consisting of up to 5 mole % $WO_3$, up to 5 mole % $MoO_3$, and up to 0.10 mole % Ag metal.

6. A sealing material containing as an active ingredient a lead-free, tin phosphate glass frit, the composition of which, as calculated in mole percent, on an oxide basis, consists essentially of 25-50% $P_2O_5$, 30-70% SnO, 0-15% ZnO, the mole ratio of SnO:ZnO being greater than 5:1, and an effective amount up to 25% total of at least one stabilizing oxide in the indicated proportion selected from the group consisting of up to 25% $R_2O$, wherein $R_2O$ consists of 0-25% $Li_2O$, 0-25% $Na_2O$, and 0-25% $K_2O$, up to 20% $B_2O_3$, up to 5% $Al_2O_3$, up to 5% $SiO_2$, and up to 5% $WO_3$.

7. A sealing material in accordance with claim 6 wherein the selected stabilizing oxide is at least $B_2O_3$ and/or $Al_2O_3$.

8. A sealing material in accordance with claim 6 wherein the phosphate glass additionally contains an effective amount of at least one seal adherence promoter in the indicated proportion selected from the group consisting of up to 5 mole % $WO_3$, up to 5 mole % $MoO_3$, and up to 0.10 mole % Ag metal.

9. A sealing material in accordance with claim 6 additionally containing a mill addition having a low coefficient of thermal expansion to reduce the effective coefficient of thermal expansion of the frit in a fusion seal.

10. A sealing material in accordance with claim 9 wherein the mill addition is selected from the group consisting of lithium aluminosilicate glass-ceramics, cordierite, and a pyrophosphate having at least one cation selected from the group consisting of $Mg^{+2}$ and $Co^{+2}$.

11. A sealing material in accordance with claim 10 wherein the mill addition is composed of particles of a magnesium pyrophosphate crystalline material.

12. A sealing material in accordance with claim 6 containing a strength reinforcing filler having a coefficient of expansion less than $120 \times 10^{-7}$/°C.

13. A sealing material in accordance with claim 12 wherein the strength reinforcing filler is selected from the group composed of alumina and zircon.

14. A sealing material in accordance with claim 6 wherein the phosphate glass contains about 33 mole percent $P_2O_5$.

15. A composite article composed of at least two component parts, the parts being joined by a fusion seal that is the fused product of a sealing material containing as an active ingredient a $SnO-ZnO-P_2O_5$ sealing glass frit, the composition of which, as calculated in mole percent on an oxide basis, consists essentially of 25-50% $P_2O_5$, 30-70% SnO, 0-15% ZnO, the mole ratio of SnO:ZnO being greater than 5:1, and an effective amount up to 25% total of at least one oxide in the indicated proportion selected from the group consisting of up to 25% $R_2O$, wherein $R_2O$ consists of 0-25% $Li_2O$, 0-25% $Na_2O$, and 0-25% $K_2O$, up to 20% $B_2O_3$, up to 5% $Al_2O_3$, up to 5% $SiO_2$, and up to 5% $WO_3$.

16. An article in accordance with claim 15 wherein the sealing material additionally contains a mill addition having a low coefficient of thermal expansion to reduce the effective coefficient of thermal expansion in the fused product.

17. An article in accordance with claim 16 wherein the mill addition is selected from the group consisting of lithium aluminosilicate glass-ceramics, cordierite, and a pyrophosphate having at least one cation selected from the group consisting of $Mg^{+2}$ and $Co^{+2}$.

18. An article in accordance with claim 15 wherein the fusion seal additionally contains a strength reinforcing filler having a coefficient of thermal expansion less than $120 \times 10^{-7}/°C$.

* * * * *

UNITED STATES PATENT AND TRADEMARK OFFICE
CERTIFICATE OF CORRECTION

PATENT NO. : 5,281,560
DATED : January 25, 1994
INVENTOR(S) : Francis, et. al.

It is certified that error appears in the above-indentified patent and that said Letters Patent is hereby corrected as shown below:

Column 9, Claim 1, last line, "SO$_2$" should be --SiO$_2$--.

Column 9, Claim 2, lines 2 and 3, "B$_2$O$_3$ and one of Al$_2$O$_3$" should read --one of B$_2$O$_3$ and Al$_2$O$_3$--.

Column 10, Claim 7, lines 2 and 3, "B$_2$O$_3$ and/or Al$_2$O$_3$" should read --one of B$_2$O$_3$ and Al$_2$O$_3$--.

Signed and Sealed this

Twenty-eighth Day of June, 1994

Attest:

BRUCE LEHMAN

*Attesting Officer*    *Commissioner of Patents and Trademarks*